Aug. 23, 1960   A. RUBIN   2,949,864
CABLE RAILWAY FOR PASSENGERS
Filed June 24, 1957   2 Sheets-Sheet 1

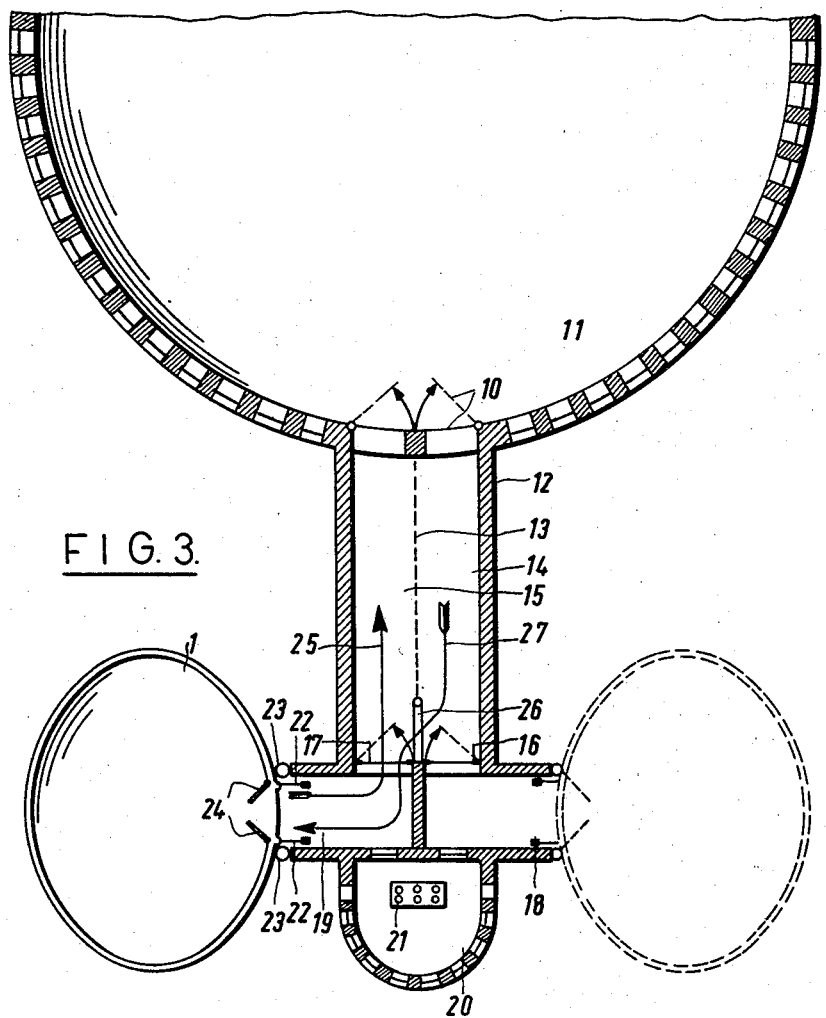

United States Patent Office 2,949,864
Patented Aug. 23, 1960

2,949,864

CABLE RAILWAY FOR PASSENGERS

Adolf Rubin, Saarbrucken, Germany, assignor to Gesellschaft für Forderanlagen Ernst Heckel m.b.H., Rohrbach, Germany, a firm of Germany Filed June 24, 1957, Ser. No. 667,622

Claims priority, application Germany June 29, 1956

10 Claims. (Cl. 105—150)

The present invention relates to improvements in passenger cable railways and particularly in cable railways in which the different stations thereof are located at considerably different altitudes.

In the operation of such cable railways it has been frequently observed that many people although quite interested in taking a ride to considerable heights, are afraid of doing so because they fear that the difference in altitude and change in atmospheric pressure might cause them physical disturbances. Others refuse because they actually know from past experience that their physical constitution will not adapt itself to a quick change of altitude.

It is an object of the present invention to provide a cable car containing a cabin which is designed to overcome such fears and even permit such persons to whom a change in atmospheric pressure is known to cause physical displeasure or harm to travel without any such effects on a cable railway which quickly ascends to or descends from considerable heights.

Another object of the invention is to provide a car for such a cable railway in which a certain atmospheric pressure may be maintained regardless of the outer atmospheric pressure or in which the inner atmospheric pressure may be increased to a value substantially corresponding to the pressure prevailing at the lower level station.

A further object of the invention is to provide a mountain or upper level station for a cable railway provided with such pressurized cable cars, as well as a passageway from the cable car to the station, in which the atmospheric pressure is increased to and maintained at the pressure prevailing in the cabin of the cable car, that is, at substantially the same pressure as in the lower level station.

According to the invention, the cabin of the cable car is designed to be completely pressurized and to be sealed so as to be airtight. For this purpose, the car is preferably given an oval or spherical shape. At its center, a vertical chamber is provided which contains passages to the inside of the cabin, as well as to the roof and bottom of the car. The inside of this central chamber may be used as an air lock in the event that it might become necessary at some point along the track to alight from the cabin either through the roof or the bottom thereof. Within the cabin seats are provided around this central chamber and also along or near the windows. For adjusting and maintaining the air pressure in the cabin and in the air lock, pressure tanks and other suitable apparatus are contained within the car.

The present invention further provides a mountain or upper level station for such cable railway with cars arriving under an increased internal pressure, as well as a passageway leading from the cars to such station. The walls of such passageway and mountain station which may also include a waiting room, a restaurant, or the like should also be pressurized and be maintained under the same pressure as prevails in the car cabins. In order to avoid any pressure leaks between the cabin and the passageway, the cabin is provided with suitable means to attach the walls of an air lock thereto. For this purpose, a cable car after its arrival at the mountain station is pressed tightly against suitable sealing means on such air lock which, if desired, may be inflatable, whereupon the air pressure in the air lock is increased to that in the cabin so that the door of the cabin may then be opened. The pressure now being equal in all the rooms, that is, in the cabin, the air lock, and the station proper including its rooms and a passageway leading from the air lock thereto, the passengers may then go to the observation room or restaurant of the mountain station, remain therein for any length of time, and then return by the same or another cable car to the ground station without ever being exposed to any other atmospheric pressure than that prevailing at the lower level station. The various controls for operating the air locks of the mountain station and the different doors thereof are preferably located in a single control room and are connected to each other so as to be operated in sequence. Thus, before the door leading from one air lock to the other or from such air lock to the main room of the station or vice versa may be opened, the previous door will be hermetically locked, thus insuring a safe operation of the station at all times.

Further objects, features, and advantages of the present invention will be apparent from the following description, particularly when read with reference to the accompanying drawings, in which—

Fig. 3 shows a diagrammatical cross section of the mountain station as taken along a central horizontal plane.

Figure 1:
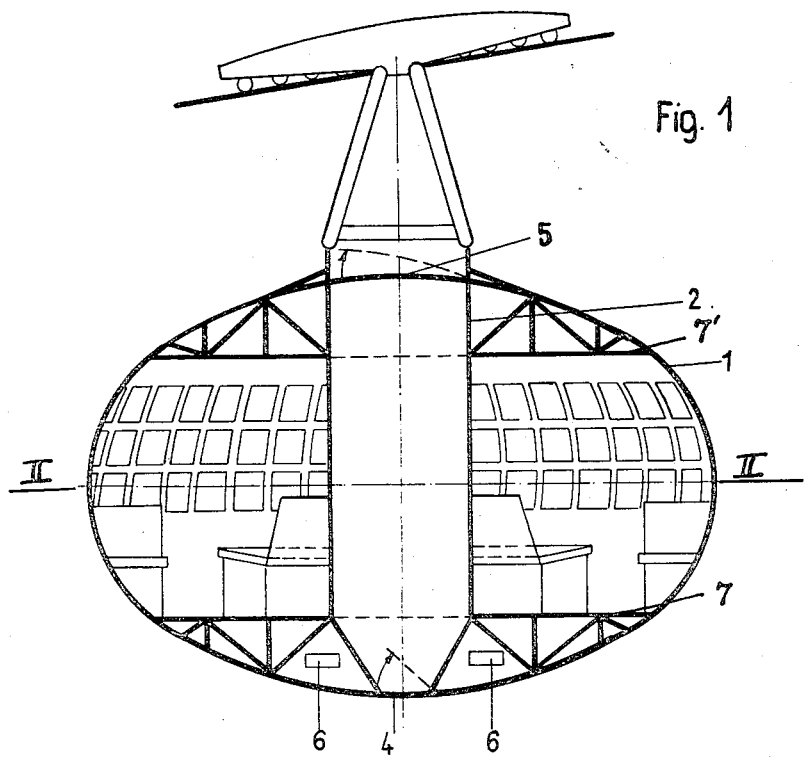
Fig. 1 shows a diagrammatical cross section of a cable car according to the invention as taken along a central vertical plane.
Figure 2:
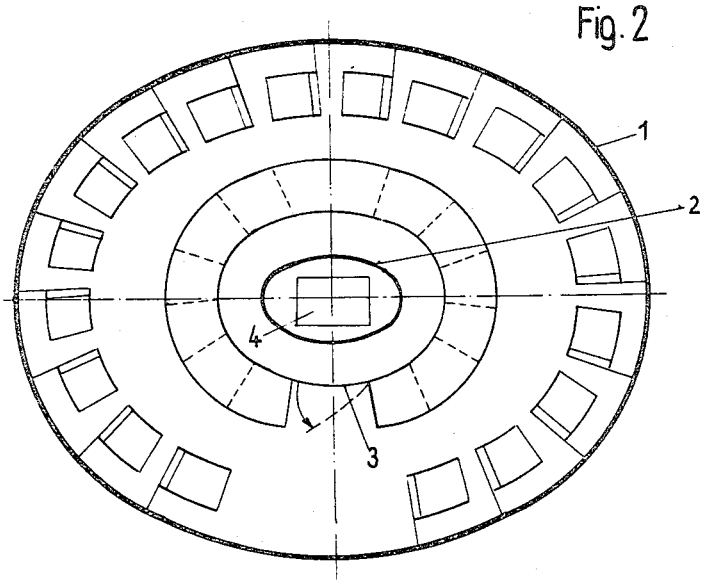
Fig. 2 shows a diagrammatical cross section of the same cable car taken along a line II—II of Fig. 1.

Referring to the drawings, Figs. 1 and 2 illustrate the basic design of the cable car having a horizontal floor 7 and ceiling 7′ and airtight walls, thus forming a pressurized cabin 1 which attains its solidity at least partly by its oval shape and the walls of a vertical tubular chamber 2 which extends centrally through the car. Chamber 2 is adapted to be sealed airtight both toward the interior of car or cabin 1 and toward the outside and may thus be used as an air lock which may be entered and left through a door 3 and a lower trap door 4 or an upper trap door 5. Thus, chamber 2 with its doors, 3, 4, and 5 may serve as an emergency exit from cabin 1. The air pressure in cabin 1 and in chamber 2 may be maintained and regulated by suitable means which are known as such and therefore do not need to be particularly illustrated. The compressed air for replenishing any pressure lost during the travel may be contained in pressure tanks 6 provided underneath the floor boards of the cabin and, if desired, also above the ceiling. The pressure in these tanks 6 may be replenished either at the ground or mountain station or both.

Fig. 3 illustrates the design and basic equipment of the mountain station. The waiting and observation room 11 which may be of any suitable design and may also include restaurant facilities is maintained under an internal air pressure corresponding to that in cabin 1. An air lock 12 is connected to room 11 by doors 10 and is likewise maintained under internal air pressure. Air lock 12 is divided by a partition 13 into two passageways 14 and 15 and sealed toward the front by doors 16 and 17 which under the increased pressure in air lock 12 are pressed tightly against their sealing straps. Doors 16 and 17 lead to separate station platforms 18 and 19, respectively, each of which, when closed by a cabin 1, forms a closed chamber and, after the pressure therein has been increased, forms another air lock. A control room 20 with controls 21 is preferably connected by separate doors 8 and 9 to platform chambers 18 and 19, respectively.

When a cabin 1 has arrived at the mountain station, gripping arms 22 which are pivotably mounted on the walls of platform chambers 18 and 19 are hooked into eyes on the outer wall of the cabin. Thereupon, the sealing hose 23 on the outer ends of the walls of chambers 18 and 19 is pumped up with air so as to press tightly against cabin 1 and seal the respective chamber 18 or 19 hermetically toward the outer atmosphere. The operator in control room 20 then increases the air pressure within cabin 1, by manipulating the controls 21 whereupon the cabin doors 24 as well as door 16 or 17 to air lock 12 and passageways 14 and 15 therein may be easily opened or open of their own accord. The passengers who have newly arrived, for example, in the left cabin 1 may then leave the cabin and pass in the direction shown by arrow 25 through the two air locks 19 and 12 and along passageway 15 into the observation or waiting room 11. The passengers wishing to return to the ground station have in the meantime assembled in passageway 14. As soon as all the arriving passengers have left cabin 1 and platform chamber 19, a gate 26 is opened so that the people waiting in passageway 14 can now pass through door opening 17 into cabin 1 in the direction as indicated by arrow 27. Cabin doors 24 are then locked hermetically from the inside. Door 17 having again been hermetically closed, the operator in control room 20 may then lower the air pressure in platform chamber 19 to the pressure of the outer atmosphere. At the same time, the sealing hose 23 is also deflated and the gripping arms 22 disconnected from cabin 1 so that the latter can then descend to the ground station. The next ascending cabin will then arrive in front of the other platform chamber 18.

All of the controls 21 for the entire mountain station including those for inflating and deflating the sealing hose 23, for controlling the air pressure in the various rooms and air locks, and for operating the doors (though not shown in detail) are located within the control room 20. The respective control levers for opening and closing the doors of the air locks are preferably designed to lock each other so as to insure a safe operation of the station. The individual operations as described may be carried out within a period of a few seconds.

If desired, one or more additional air locks (not shown) may be provided to allow the personnel of the station, as well as any passengers who are not afraid of the pressure difference, to enter or leave the station. However, the pressure in such air lock should be increased or decreased only very slowly so as to avoid any physical discomfort or harm.

Although my invention has been illustrated and described with reference to the preferred embodiments thereof I wish to have it understood that it is in no way limited to the details of such embodiments, but is capable of numerous modifications within the scope of the appended claims.

Having thus fully disclosed my invention, what I claim is:

1. In combination with a cable railway for passengers, a lower level station, a mountain station, at least one cable connecting said stations, at least one cable car, movable from one station to the other, said cable car comprising a pressurized cabin having outer walls adapted substantially to maintain within said cabin the air pressure prevailing at said lower level station, means for increasing the air pressure within said mountain station substantially to the pressure prevailing in said cabin, and releasable means for connecting said cabin to said mountain station substantially without change of air pressure in said cabin and mountain station.

2. The combination as defined in claim 1, wherein said cable car further comprises a substantially central chamber extending vertically through said cabin and forming a reinforcement of said cabin.

3. The combination as defined in claim 1, wherein said cable car further comprises a substantially central chamber extending substantially vertically through said car and having a plurality of doors connecting said chamber with the inside of said cabin and the outside of the car.

4. The combination as defined in claim 1, wherein said cable car further comprises a central chamber extending substantially vertically through said car and having a plurality of doors connecting said chamber with the inside of said cabin and the outside of the car, the air pressure within said chamber being adjustable so as to permit the same to be used as an air lock for an emergency exit from said car.

5. The combination as defined in claim 1, further comprising at least one pressure tank within said car adapted to hold a supply of compressed air for regulating the air pressure within said cabin.

6. In combination with a cable railway for passengers, a lower level station, a mountain station, at least one cable connecting said stations, at least one cable car movable from one station to the other, said cable car comprising a pressurized cabin having outer walls adapted substantially to maintain within said cabin the air pressure prevailing at said lower level station, means for increasing the air pressure within said mountain station substantially to the pressure prevailing in said cabin, and releasable means for connecting said cabin to said mountain station substantially without change of air pressure in said cabin and mountain station, further comprising a chamber connected to said mountain station and having an open end, said cabin having a door opening and a door for opening and closing said opening, means on said open end of said chamber and on the outside of said car for removably and hermetically connecting the same to said open end, the air pressure within said chamber being increasable after said car has been connected thereto to a pressure substantially equal to that within said cabin, so that said cabin door may then be opened to allow the passengers to alight from said cabin and enter said mountain station substantially without being subjected to any change in air pressure.

7. The combination as defined in claim 6, further comprising a door separating said chamber from said station, said connecting means comprising means for removably securing said car to said open end of said chamber, sealing means on said open end, said sealing means being inflatable so as to press the same against the outer wall of said car and thus form a hermetical connection between said car and said chamber.

8. The combination as defined in claim 7, the air pressure within said first chamber being increasable substantially to a pressure equal to that within said cabin and said pressure being maintainable separately from the pressure within said station.

9. The combination as defined in claim 8, further comprising an additional chamber forming an air lock intermediate said first chamber and said station.

10. The combination as defined in claim 8, further comprising a chamber in said mountain station, and control means within said last chamber for controlling the operation of all of said means for increasing and maintaining the air pressure of the different parts of said mountain station.

References Cited in the file of this patent

UNITED STATES PATENTS

| | | |
|---|---|---|
| 995,060 | Downing | June 13, 1911 |
| 1,023,825 | Edwards | Apr. 23, 1912 |
| 1,853,570 | Muller | Apr. 12, 1932 |
| 1,916,684 | Powell | July 4, 1933 |
| 2,265,461 | Wagner | Dec. 9, 1941 |
| 2,414,202 | Jepson et al. | Jan. 14, 1947 |
| 2,513,332 | Kemper | July 4, 1950 |